Oct. 6, 1936.  G. P. S. CROSS  2,056,714
SHOE SUPPORTING JACK
Filed May 15, 1935   7 Sheets-Sheet 2

Witness
F.A.Wright

Inventor
Garrett P. S. Cross
by Fish Hildreth
Cary & Jenney Attys.

Oct. 6, 1936.  G. P. S. CROSS  2,056,714
SHOE SUPPORTING JACK
Filed May 15, 1935  7 Sheets-Sheet 5

Witness
Frank A. Wright

Inventor
Garrett P. S. Cross
by Fish Hildreth
Cary & Jenney Attys.

Oct. 6, 1936.　　　　G. P. S. CROSS　　　　2,056,714
SHOE SUPPORTING JACK
Filed May 15, 1935　　　　7 Sheets-Sheet 6
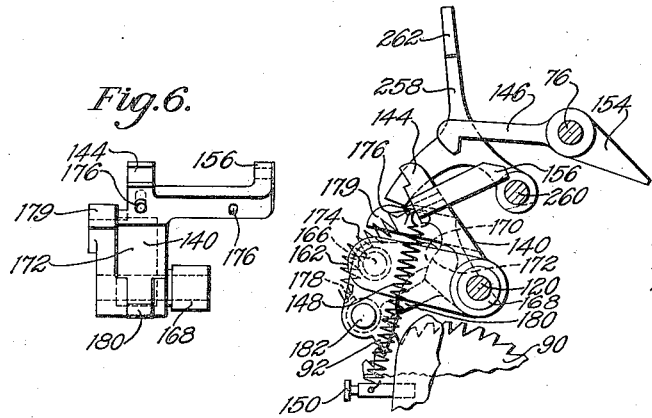
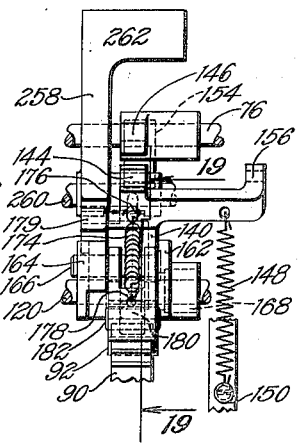
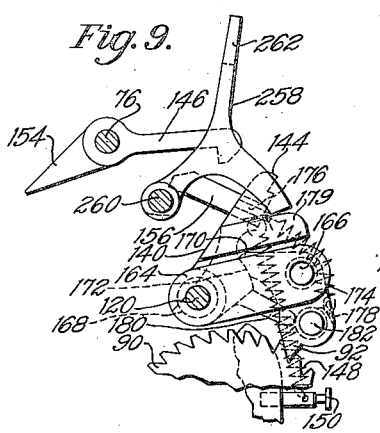
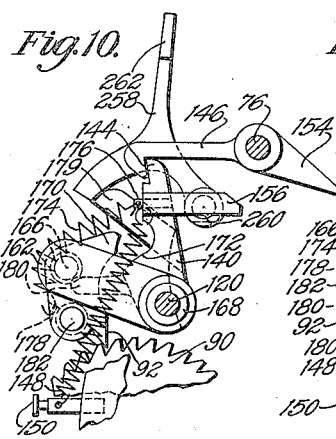
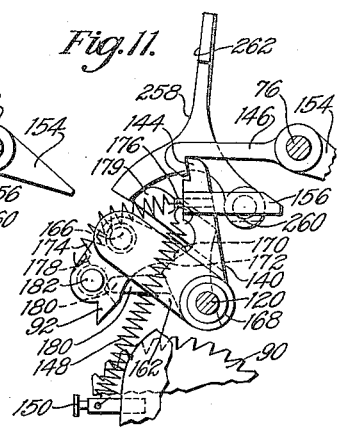
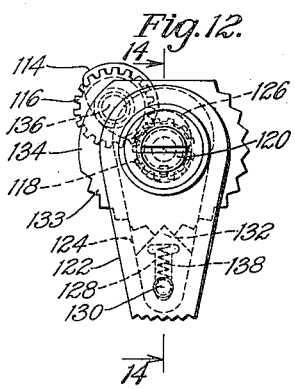
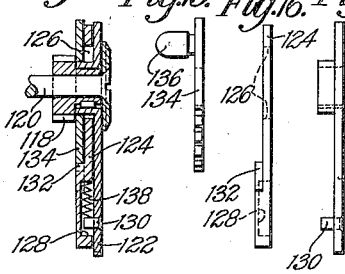
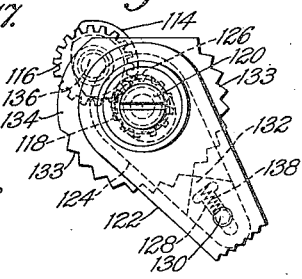
Inventor
Garrett P. S. Cross
by Fish Hildreth
Cary & Jenney Attys.
Witness
Frank A. Wright Oct. 6, 1936.　　　G. P. S. CROSS　　　2,056,714
SHOE SUPPORTING JACK
Filed May 15, 1935　　　7 Sheets-Sheet 7

Witness
Frank A. Wright

Inventor
Garrett P. S. Cross
by Fish Hildreth
Cary & Jenney Attys

Patented Oct. 6, 1936

2,056,714

UNITED STATES PATENT OFFICE 2,056,714

SHOE SUPPORTING JACK

Garrett P. S. Cross, Beverly, Mass., assignor to United Shoe Machinery Corporation, Paterson, N. J., a corporation of New Jersey Application May 15, 1935, Serial No. 21,542

20 Claims. (Cl. 12—127)

The present invention relates to a shoe supporting jack, and more particularly to improvements in a jack of the general type which is adapted for use in automatic machines for positioning and feeding a shoe with relation to shoe operating devices to transfer the point of operation about the sole margin of the shoe. The jack herein disclosed is an improvement on the jack illustrated in the applicant's copending application Serial No. 584,325, filed January 2, 1932.

It is a principal object of the present invention to provide a shoe supporting jack of simple and improved construction which is well adapted for manual operation to permit the locating and clamping of a lasted shoe on the jack by the operator.

More specifically, it is an object of the invention to provide in a jack of this general description cooperating locating and clamping devices of simple construction which may be readily manipulated by the operator to clamp the shoe firmly and accurately in position for an operation on the shoe, and thereafter to release the shoe.

Figure 1:
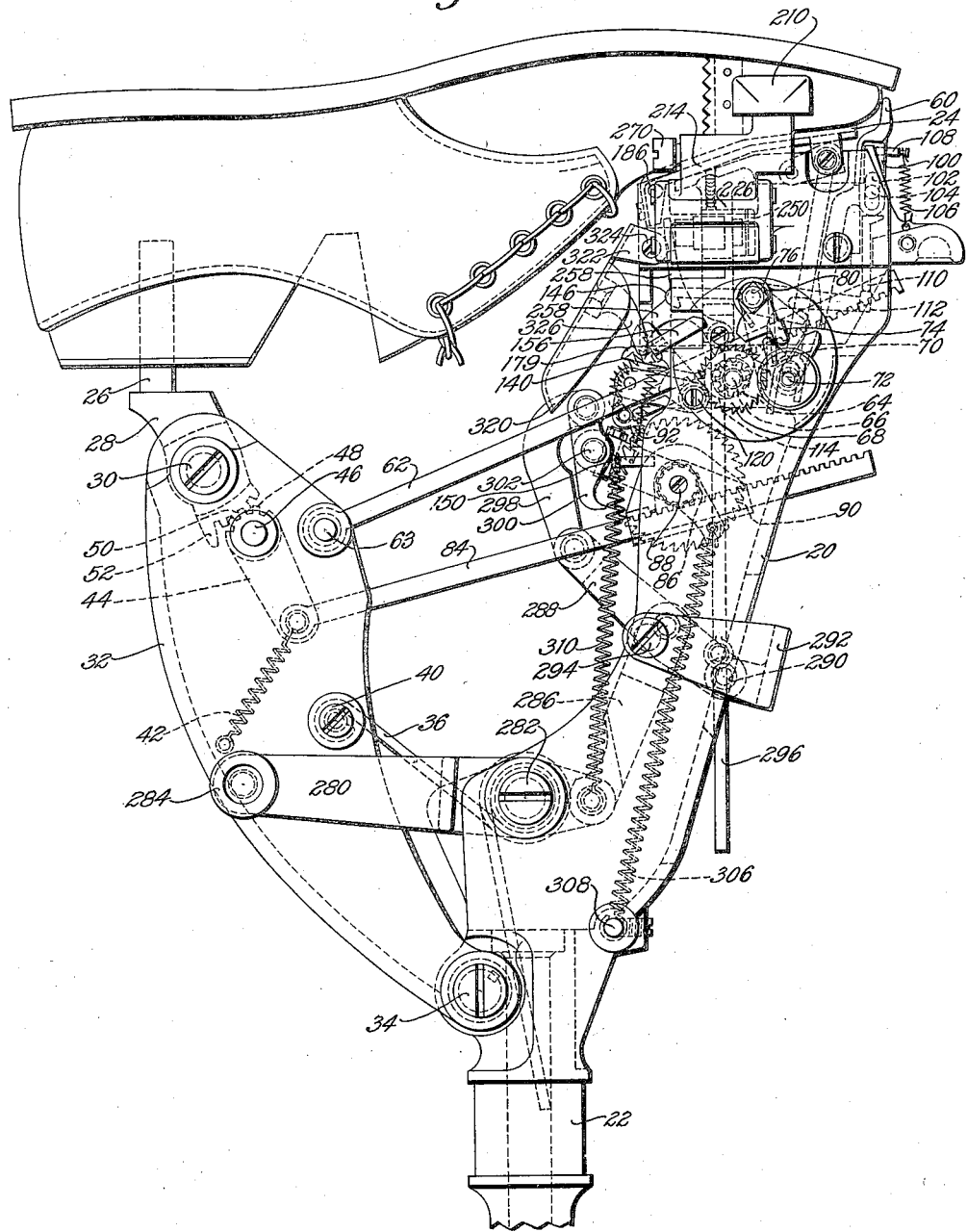
Figure 2:
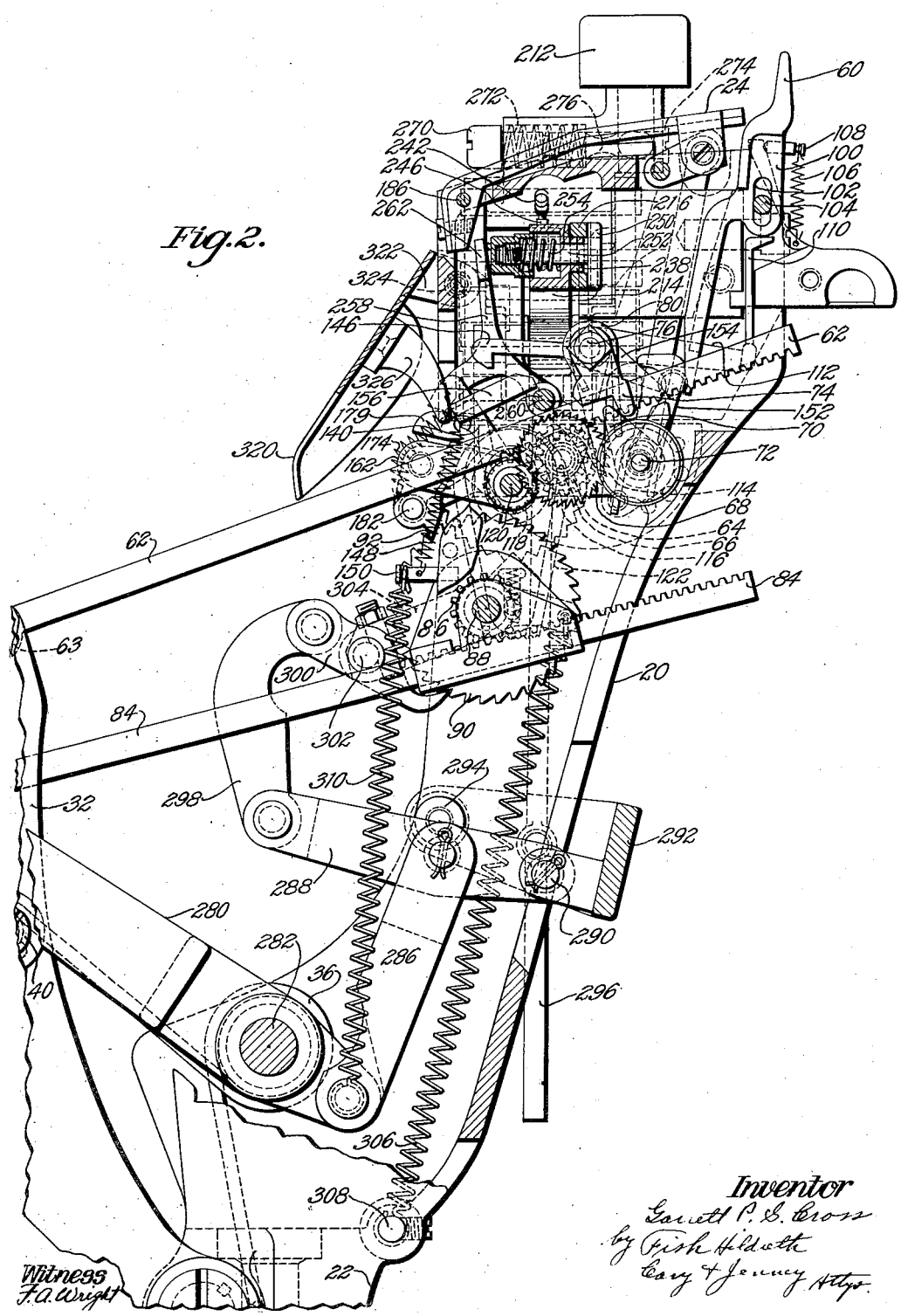
Figure 3:
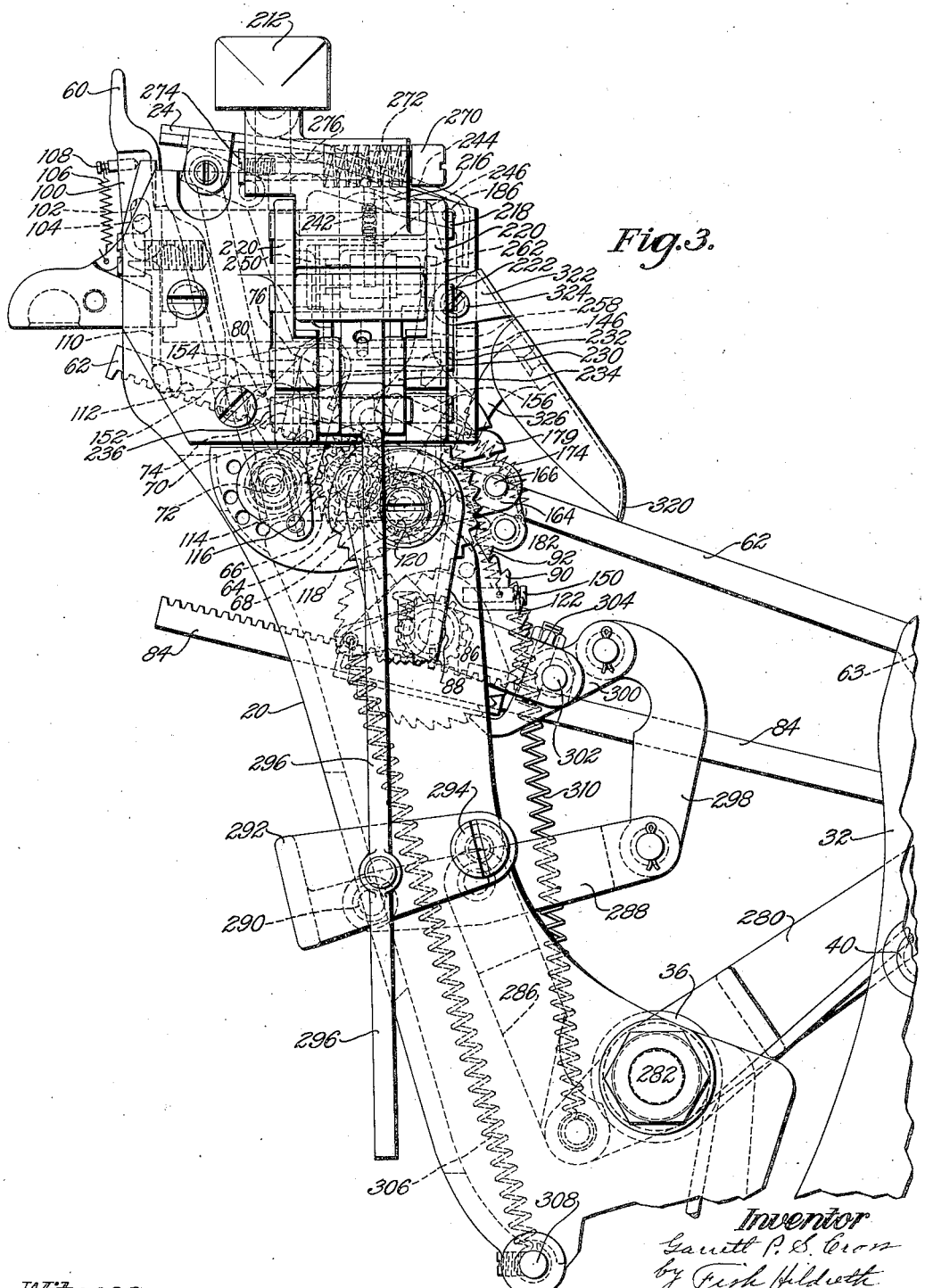
Figure 4:
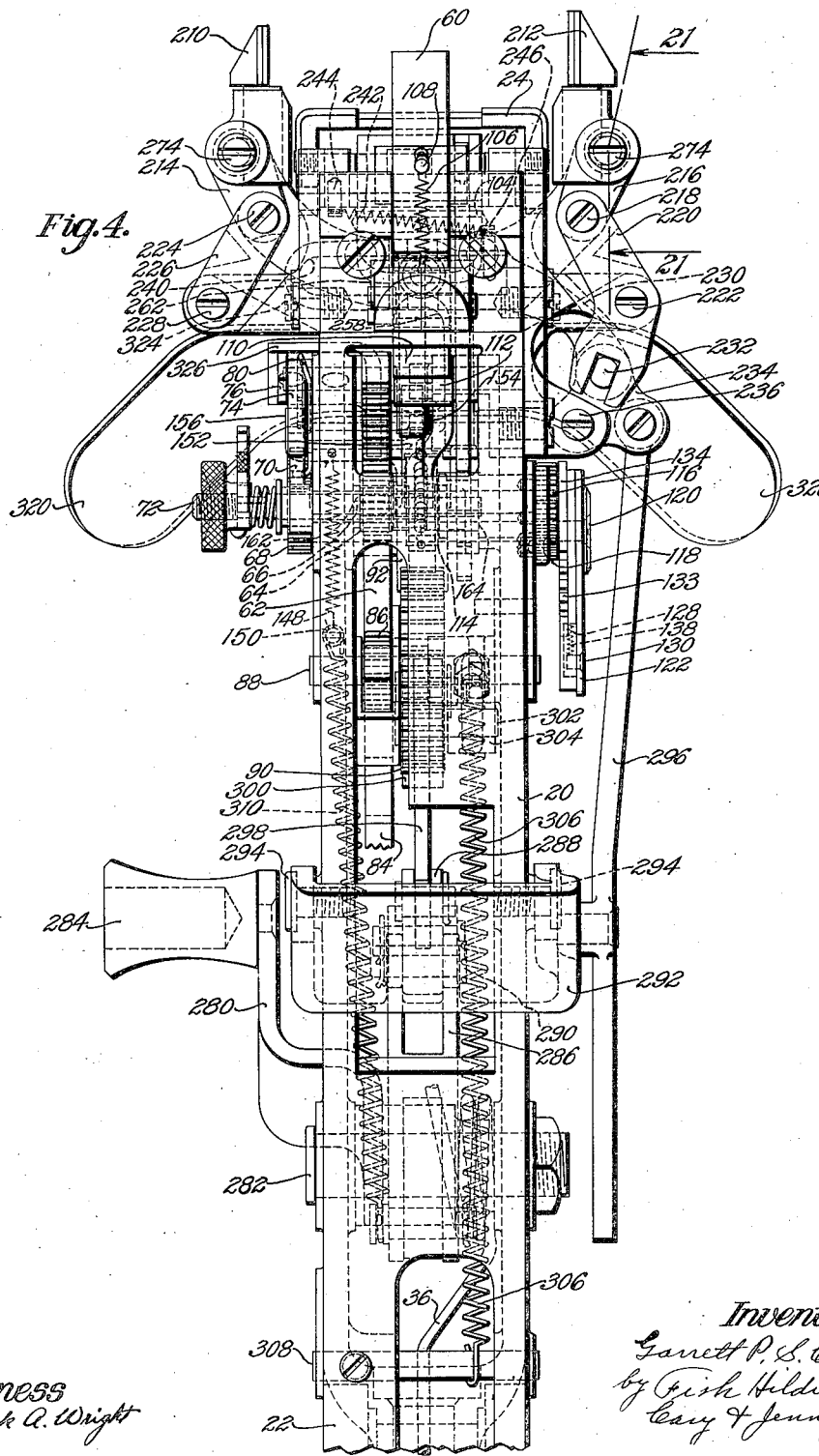
Figure 5:
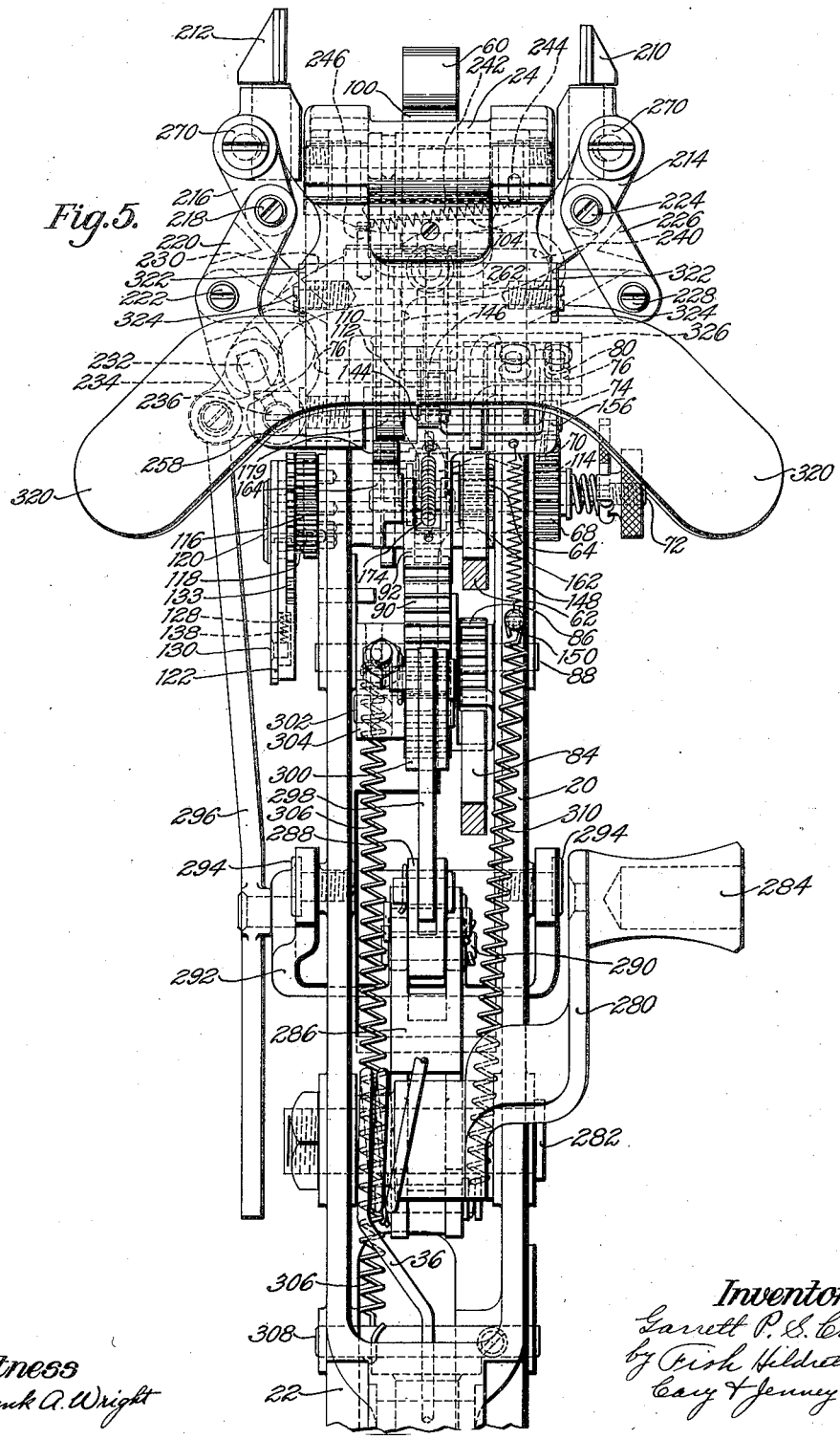
Figure 18:
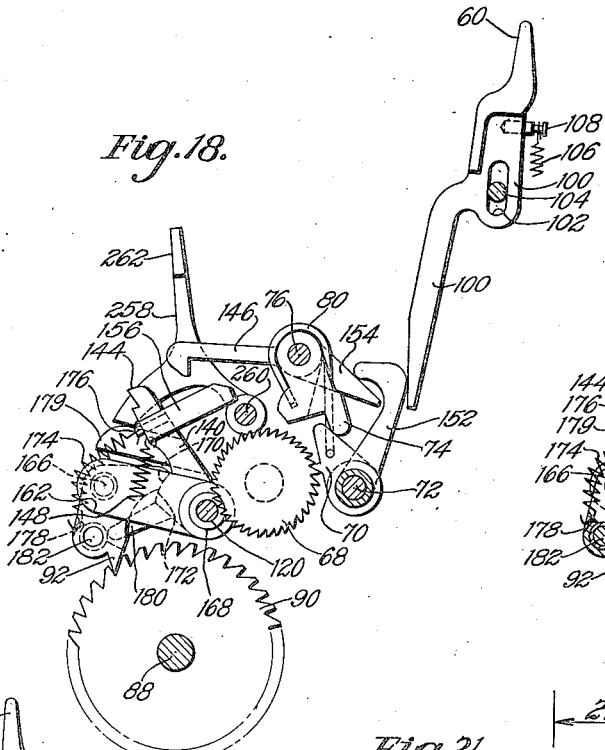
Figure 19:
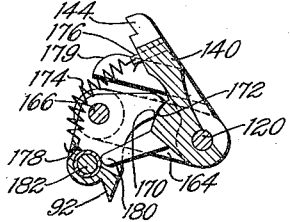
Figures 21, 23:
Figure 20:
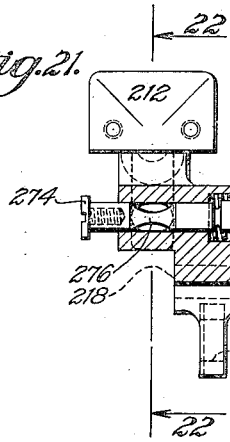
Figure 22:
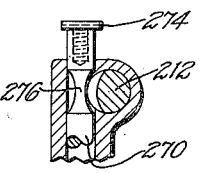

With these and other objects in view as may hereinafter appear, the several features of the invention consist in the devices, combinations and arrangement of parts hereinafter described and claimed, which together with the advantages to be obtained thereby, will be readily understood by one skilled in the art from the following description taken in connection with the accompanying drawings, in which Fig. 1 is a view in front elevation of a jack embodying the several features of the present invention, the jack being shown with a lasted shoe clamped in operating position; Fig. 2 is an enlarged view in front elevation with the frame broken away, of the toe portion of the jack with the parts in the positions taken during the manual operation of clamping a shoe in the jack; Fig. 3 is a view in rear elevation of the parts shown in Fig. 2, and with the parts in the same positions; Fig. 4 is a view in right side elevation of substantially the parts shown in Fig. 2; Fig. 5 is a view in left side elevation of substantially the parts shown in Fig. 2; Fig. 6 is a detail view, looking from the left of the detent control lever; Fig. 7 is a detail view in front elevation of the detent control lever, locking detent, toe clamp, release lever, and latch lever for holding these parts out of operation, the parts being shown in the positions taken with a shoe clamped in the jack; Fig. 8 is a view of the parts shown in Fig. 7 looking from the left; Fig. 9 is a rear view of the parts shown in Fig. 7; Fig. 10 is a view similar to Fig. 7, with the parts in the positions taken with the detent control lever latched out of operation, and the locking detent about to be disengaged from its ratchet; Fig. 11 is a view similar to Fig. 10 in the final position taken upon movement of the detent control lever to its latched inoperative position; Fig. 12 is a detail view looking from the rear, of the manually operable mechanism for adjusting the vertical position of the toe trip or feeler; Fig. 13 is a view similar to Fig. 12 taken during the adjustment of the parts for a different vertical position of the feeler; Fig. 14 is a sectional view taken on the line 14—14 of Fig. 12; Fig. 15 is a detail view looking from the left, of the stationary ratchet segment forming a part of the assembly shown in Fig. 12; Fig. 16 is a view looking from the left, of the detent member forming part of the assembly illustrated in Fig. 12; Fig. 17 is a detail view looking from the left, of the manually operable control member forming part of the assembly shown in Fig. 12; Fig. 18 is a view similar to Figure 7, but illustrating in addition the toe trip or feeler, the stop detent and ratchet wheel for limiting the movement of the heel supporting arm towards the toe rest and the connections between the feeler and the latch lever; Fig. 19 is a detail sectional view taken on the line 19—19 of Figure 8; Fig. 20 is a detail view similar to Figure 12, but showing in addition the toe trip or feeler and the connections between the feeler and the manually operable adjusting cam; Fig. 21 is a detail view taken on the line 21—21 of Figure 4, illustrating the construction for removably securing one of the toe grips in its carrier arm; Fig. 22 is a detail sectional view, taken on the line 22—22 of Figure 21; and Fig. 23 is a detail sectional view taken on the line 23—23 of Figure 22.

The jack herein disclosed as embodying in a preferred form the several features of the invention, is intended particularly for use in an automatic machine of the general type disclosed, for instance, in the patent to Topham, No. 1,616,718, dated February 8, 1927, in which feeding, turning and lengthwise and lateral tipping movements are imparted to the jack automatically to transfer the point of operation about the sole margin of a lasted shoe supported on the jack. The jack herein disclosed is in many respects similar to the automatically operated jack illustrated in the applicant's copending application above referred to, comprising a toe support mounted on a jack frame, and a last pin formed on a heel support lever which is pivoted for tilting movements on an arm which is in turn pivoted on the frame for movements toward and away from the toe support. As in the jack of the applicant's copending application referred to, there are provided adjustable toe clamping devices, a stop device which is tripped into operation by the engagement of the toe of the shoe with a feeler to arrest the movement of the heel supporting arm toward the toe rest, and a locking device also operated by the feeler which is connected through an intermediate lever and gearing to the tilting heel supporting lever to lock the lever against tilting movements and the arm against swinging movement respectively away from the toe rest to lock the shoe toe downwardly and longitudinally in engagement with the toe rest. Jacks of the general type described as previously constructed, have been arranged to close automatically upon the placing of a shoe on the last pin, and to open automatically upon the completion of the operation on a shoe.

In carrying out the present invention, a jack of the general type above set forth, has been provided, in which the operations of closing, clamping, and thereafter releasing the jack at the end of an operation on a shoe, are manual. To this end the jack herein disclosed embodies a number of novel and improved features adapted to permit the performance of these operations by the operator without loss of time, while at the same time insuring a more accurate and secure locating and clamping of the shoe on the jack.

In accordance with one feature of the invention, the heel supporting arm of the simplified and improved jack herein disclosed, is mounted to swing about a fixed pivot on the jack frame, and is normally held yieldingly in a retracted or open position by means of a spring which is of sufficient strength to insure the opening of the jack when released by the operator. Spring means are also provided which tend to tilt the heel supporting lever about its pivot away from the toe rest, so that the jack is normally held with the parts in position for the placing of a lasted shoe in position on the heel post, and the subsequent jacking or clamping of the shoe on the jack.

Another feature of the present invention consists in the provision of novel and improved means for manually tightening the jack to rigidly clamp the shoe in position on the jack. The means provided for clamping the shoe comprises a manually operable lever which operates through connections hereinafter more fully to be described, first to tighten the toe clamps to position the toe of the shoe laterally in the jack, and thereafter to tighten the locking device to move the shoe toe downwardly into firm locking engagement with the toe support.

Another feature of the present invention consists in the provision of a novel and improved locking detent for engagement with the locking ratchet which may be readily released by the operator in opening the jack without danger of injury to or stripping of the ratchet teeth due to the heavy clamping pressure applied in jacking the shoe.

Referring more specifically to the drawings, the jack disclosed comprises a frame 20 which is rigidly mounted on a jack supporting spindle 22, and carries a toe rest 24. The jack is also provided with a heel support in the form of a last pin 26 which is carried on a heel supporting lever 28 mounted for tilting movements about a pivot 30 on an arm 32 which is mounted for swinging movements toward and away from the toe rest about a pivot 34 supported on the lower part of the frame 20. A spring 36 coiled about a pivot stud 38 on the frame 20, and having one end secured to a pin 40 on the arm 32 and its other end anchored within the hollow spindle 22, tends normally to hold the arm 32 in an extreme open position away from the toe rest 24. The heel supporting lever 28 and last pin 26 are normally tilted away from the toe rest by means of connections which include a spring 42 connected at one end to the arm 32 and at its other end to a lever arm 44 which is pivoted on a stud 46 on the arm 32, and has formed on the hub thereof a gear segment 48 arranged to mesh with a corresponding gear segment 50 on a downward extension of the heel supporting lever 28. The tilting movement of the lever arm 28 and last pin 26 away from the toe rest under the pressure of the spring 42 is limited by the engagement of an enlarged tooth 52 on the heel supporting lever 28 with the hub of the lever 44.

With the construction and arrangement of parts as above set forth, it will be seen that the jack is normally held in an open position to permit the operator readily to place a shoe on the last pin 26 preparatory to locating or jacking a shoe on the jack. After the shoe has been placed on the last pin, the arm 32 can be swung forwardly, and the shoe supported on the heel supporting lever 26 tilted by the operator to swing the shoe forwardly and downwardly to locate the shoe toe with relation to the toe support 24.

When the shoe reaches its adjusted position on the jack, the shoe toe engages with and actuates a feeler member 60 which operates a stop device to prevent further movement of the arm 32 toward the toe rest, and at the same time operates a locking device to lock the heel supporting lever 28 and arm 32 against movement away from the toe rest, so that the shoe is positively held in a longitudinally adjusted position on the jack. The stop mechanism for arresting the movement of the arm 32 toward the toe rest, is similar to the mechanism disclosed in applicant's pending application, and comprises a stop rack 62 which is pivotally mounted at 63 on the arm 32, and at its other end is provided with rack teeth which engage with a pinion 64 secured to a rotatable shaft 66 journaled in bearings in the toe supporting frame 20. There is also secured to the shaft 66, a stop ratchet wheel 68 which is arranged for engagement with a stop detent 70 loosely mounted to turn on a shaft 72. The position of the detent is controlled by means of a dog 74 which is supported on a pivot pin 76, and is provided with a downward projection arranged for engagement behind an upwardly projecting portion of the detent 70. The dog 74 and detent 70 are moved yieldingly into engagement with the stop ratchet 68 by means of a tension spring 80 which is bent over the pivot 76 and is secured at one end to the dog 74, and at its other end to the detent 70. The spring 80 tends to straighten, so that it has an action to swing the dog 74 toward the ratchet 68, carrying with it the detent 70.

As in the jack disclosed in applicant's pending application, the mechanism for locking the heel supporting lever 28 and arm 32 against tilting and swinging movements respectively away from the toe rest, comprises a locking rack 84 which is pivotally secured at one end to the lever 44, and at its other end is provided with rack teeth arranged for engagement with a pinion 86 secured to a rotatable shaft 88 supported in bearings in the frame 20. There is also secured to the shaft 88 a locking ratchet 90 which is arranged for engagement by a locking detent 92.

The toe engaging feeler member is also similar both in construction and mode of operation to that illustrated in the applicant's copending application above referred to. The feeler member is formed at the upper end of a lever arm 100 which is slotted at 102 to receive a stationary pivot and guide pin 104, so that the feeler 60 is permitted both vertical sliding and pivotal movements with relation to the pin 104. A small tension spring 106 stretched between a pin 108 on the feeler arm 100 and a point on the frame 20, tends yieldingly to move the feeler member downwardly. The vertical position of the feeler is determined through connections which comprise a vertical slide member 110 which is provided at its upper end with an offset bearing surface arranged to engage with a portion of the feeler arm 100, and at its lower end engages a laterally extending arm of a bell-crank lever 112. A downwardly extending arm of the bell-crank 112 in turn engages against the surface of a cam disk 114 loosely sleeved on the rotatable shaft 66. With the present construction the angular position of the cam 114 to determine the corresponding vertical adjustment of the feeler 60 instead of being determined automatically as in the jack disclosed in applicant's pending application, is determined manually through connections which include a gear 116 supported on the sleeve hub of the cam 114, and arranged to mesh with a gear 118 sleeved to a pivot shaft 120 which extends to the rear side of the casing 20 as shown in Figs. 3 and 14. The angular positions of the gear 118, gear 116 and cam 114 are controlled by means of a manually operable lever 122 (see Figs. 3, 4, 5, 12, 13, and 20) keyed to the sleeve hub of the gear 118 and provided at its lower end with a corrugated edge to facilitate operation by the operator. The angular adjustments of the lever 122 and cam 114 connected thereto, are maintained by means of a detent member in the form of a plate 124 which is provided with an elongated slot 126 arranged to fit over the hub of the lever 122, and an elongated recess 128 arranged for engagement with a pin 130 in the lower end of the lever 122. There is also provided on the detent member 124 a V-shaped detent surface 132 which is arranged for engagement with any one of a series of correspondingly shaped indentations 133 formed on a plate 134 which is also mounted on the hub of the lever 122, and is held rigidly in position against rotational movement therewith by engagement of a pin 136 formed thereon with an axial bore formed in the outer surface of the gear 116. A small compression spring 138 supported in the recess 128 with one end connected to the pin 130 and the other end bearing against the upper end of the recess, tends to maintain the detent arm 124 and detent 132 in yielding engagement with the indentations 133 to maintain the manually operable lever 122 and associated parts in adjusted position to determine the vertical position of the feeler 60.

In accordance with the present invention, a novel and improved mechanism is provided which is actuated by a rotational movement of the feeler arm 100 about the pivot pin 104 upon engagement of the shoe toe with the feeler 60 to control the operation of the stopping detent 70 and locking detent 92 to move both detents into operation, and thereafter for disengaging the detents when it is desired to open the jack and release the shoe supported thereon. This mechanism comprises a pawl control lever 140 (see Figs. 6 to 11, 18 and 19) which is loosely pivoted to turn on the pivot shaft 120, and is provided with an upwardly extending arm 144 arranged for engagement with a latch lever 146 supported on the pivot stud 76 to maintain the control lever and the detents in the normal inoperative position. A tension spring 148 secured at one end to a pin 150 on the machine frame and at its other end to the control lever 140, acts upon the releasing of the latch 146 to swing the control lever in a counterclockwise direction, as illustrated for instance in Fig. 7, to engage the stopping and locking detents with their respective ratchets. The latch lever 146 is tripped to permit the operation of the control lever 140 under the pressure of its spring 148 to engage the detents and lock the shoe on the jack through connections from the feeler 60 comprising an upwardly extending trip lever 152 (see Fig. 18) which is pivoted on the shaft 72, and is provided at its upper end with a laterally extending projection arranged for engagement with a heel 154 on the latch lever 146. The trip lever 152 is also engaged by a downwardly extending arm of the feeler lever 100, so that a movement of the lever 100 about its pivot 104 upon engagement of the shoe toe with the feeler 60, will move the trip lever 152 to the left, as shown in Figs. 2 and 18, to raise the latch lever 146 and thus trip the detent control lever 140 into operation.

The operation of the stopping detent 70 is controlled from the control lever 140 through the engagement of an extension 156 on the lever 140 with a corresponding bearing surface on the dog 74. As in the application above referred to, a movement of the control lever in a clockwise direction about its pivot as shown in Figs. 2 and 18, causes the extension 156 thereof to engage with and move the dog 74 and detent 70 controlled thereby out of engagement with the stop ratchet 68. The movement of the control lever 140 about its pivot in a counterclockwise direction under the pressure of the spring 148 when released by the tripping of the latch lever 146, causes the extension 156 to move out of engagement with the dog 74, so that the dog and detent 70 are permitted to move into operative position under the pressure of the spring 80. As clearly shown in Fig. 1 of the drawings, the teeth of the stop ratchet 68 are undercut so that the detent 70 is held positively in locking engagement therewith until released by a reverse rotation of the ratchet in opening the jack.

The operation of the locking detent 92 is controlled from the control lever 140 through connections of novel and improved construction and mode of operation which are arranged in locking the shoe upon the jack to move the detent into positive locking engagement with the ratchet, and in opening the jack to release the detent in such a manner as to relieve the heavy clamping pressure between the detent and ratchet prior to the disengagement of the detent from the ratchet, and thus to prevent excessive wear and possible breaking of the ratchet teeth as the detent is withdrawn from engagement therewith. To this end the detent 92 is carried on a detent lever or frame comprising two lever arms 162 and 164 pivoted concentrically with the control lever 140 on the shaft 120 and connected at their free ends by means of a stud 166 which serves also as a pivot for the detent 92. For convenience of assembly the lever arm 162 is mounted to turn on the sleeve hub 168 of the control lever 140 and has the stud 166 formed as an integral part thereof. The lever arm 164 is mounted to turn on the shaft 120 adjacent the opposite side of the control lever 140 and is journalled at its free end to receive the stud 166 so that the lever arms 162 and 164 and stud 166 are rigidly secured together to turn as a single unit. The movement of the detent 92 about the pivot stud 166 in a clockwise direction is limited by the engagement of a tail 170 on the detent with a corresponding surface 172 on the control lever 140. A tension spring 174 which passes over the stud 166 in a slotted hub portion of the detent 92, and is connected at one end to a pin 176 on the control lever 140 and at its other end to a hole 178 in the detent, acts normally to maintain the detent in a straightened position with the tail 170 in engagement with the surface 172 and with the supporting lever or frame comprising the arms 162 and 164 in a fully raised position which is determined by the engagement of the arm 164 with an abutment 179 on the control lever 140, all as illustrated in Figs. 7 and 11. With the detent 92 and detent lever comprising the arms 162 and 164 in the raised position shown in these figures with relation to the control lever 140, the detent is positively held in its straightened position by means of an extension 180 of the control lever which extends into the slotted portion of the detent 92, and engages with a pin 182 extending through the lower end of the detent adjacent the end of the slotted portion thereof.

With the parts in the normal inoperative position illustrated in Fig. 11, corresponding to the open position of the jack, in which the control lever 140 is latched out of operation by the latch lever 146 against the pressure of the spring 148, it will be seen that the detent 92 is positively held in a fully retracted position out of engagement with the ratchet 90. When the latch lever 146 is tripped to release the detent control lever 140 to lock the shoe in position on the jack, the lever 140 together with the detent supporting lever or frame including the arms 162 and 164 and the detent 92 are moved downwardly as a unit under the influence of the spring 148 to the position shown in Fig. 7, to bring the detent 92 into locking engagement with the ratchet 90. When the control lever 140 is moved upwardly or in a clockwise direction to release the shoe, the detent 92 and detent supporting lever are maintained in locking position due to the relatively heavy clamping pressure of the detent 92 against the tooth of the ratchet 90 engaged thereby, so that the extension 180 of the detent control lever 140 is moved relatively to the detent 92 out of engagement with the stud 182, thus releasing the detent which is now permitted to turn about the stud 166 against the pressure of the spring 174 to permit a free rotation of the locking ratchet 90 to open the jack. The position of the parts at this point in the operation is illustrated in Fig. 10. As the detent control lever 140 is again latched in its inoperative position, the detent supporting lever comprising the arms 162 and 164 is moved upwardly, and the detent is again moved to its straightened position as illustrated in Fig. 11, under the influence of the spring 174.

The shoe toe is centered in a direction widthwise of the shoe upon the toe support 24 when a shoe is located on the jack, and is thereafter rigidly clamped with relation to the toe support by means of a pair of toe grips 210 and 212, which together with the supporting and actuating mechanisms therefor, are substantially similar to the corresponding parts fully illustrated and described in the applicant's copending application above referred to. The toe grips comprise T-shaped pieces having vertical leather-faced shoe engaging surfaces which are arranged to engage the opposite sides of the bulging upper of the toe portion of the shoe. The toe grips are provided with downwardly extending cylindrical portions which are loosely fitted into sockets formed respectively in two movable supporting members 214 and 216 hereinafter referred to as toe grip carrier arms. Each of the carrier arms 214 and 216 is shaped to extend downwardly and horizontally, so that they are located parallel and in close proximity to each other under the toe plate 24. The side arms 214 and 216 and the toe clamps 210 and 212 carried respectively thereon, are mounted to move toward and away from each other substantially in planes inclined downwardly toward a center line of the jack, the carrier arm 216 being pivotally secured at 218 to an upwardly extending H-shaped lever 220 pivoted at 222 on the jack frame, and the carrier arm 214 being supported at 224 on a lever arm or link 226 which is arranged to turn on a fixed pivot 228 on the jack frame. In order to control the position of the carrier arms 214 and 216, and also to provide an additional support therefor, the carrier arm 214 is provided with a downwardly extending portion 230 journalled to receive a pivot pin 232 in one arm of a bell-crank lever 234 pivoted at 236 on the jack frame. The two ends of the pivot pin 232 are flattened to engage with slots formed respectively in the downward extending arms of the H-shaped carrier lever 220, so that a movement of the bell-crank 234 about its pivot acts to move the carrier arm 214 and toe grip 210 inwardly or outwardly as the case may be, and acts simultaneously by rocking the lever 220 about its pivot 222 to impart corresponding inward or outward movements to the carrier arm 216 and toe grip 212. The carrier arm 216 is maintained in proper angular position during the relative movements of the carrier arms and toe clamps above described, by means of a boss 238 which projects laterally from the carrier arm 214 and engages with a guideway 240 formed in the horizontal extension of the carrier arm 216. A tension spring 242 stretched between a stud 244 on the jack frame 20 and at its other end to a stud 246 on the carrier arm 214, acts normally to hold the carrier arms and toe clamps 210 and 212 at the limit of their movement away from each other.

After the carrier arms 214 and 216 have been moved relatively toward each other to bring the toe clamps 210 and 212 into clamping engagement with the shoe, these parts are locked in clamping position against movement away from each other by means of a locking device which comprises a locking block 250 which is mounted on a plunger 252 journalled to extend through the boss 238 on the carrier arm 214, and is provided on one face thereof with ratchet teeth arranged for engagement with corresponding ratchet teeth formed on the laterally extending portion of the carrier arm 216. A compression spring 254 coiled about the plunger 252 between an enlarged head thereon and an adjacent portion of the carrier arm 214 tends to maintain the block 250 in locking engagement with the ratchet teeth on the carrier arm 216.

The locking block 250 is released to permit the return of the toe clamps to their spread or open position in releasing a shoe from the jack, by the operation of the control lever 140 above described through connections comprising a lock release lever 258 which is pivoted on a shaft 260 on the jack frame 20, and has formed at its upper end a laterally extending plate 262 arranged for engagement with the enlarged head of the plunger 252. A lateral extension of the lock release lever 258 is arranged for engagement with the upper side of the extension 179 of the detent control lever 140, so that the movement of the control lever 140 in the clockwise direction previously described in connection with Figs. 7 and 11, to its inoperative position to release a shoe from the jack, causes the lock release lever 258 to engage with and move the plunger 252 and locking block 250 out of locking position against the pressure of the spring 254 to release the toe clamps 210 and 212. Conversely, the movement of the control lever 140 in a counterclockwise direction upon the tripping of the latch 146 to lock the shoe in position on the jack, permits the lock release lever 258 to move away from the plunger 252, so that the locking block 250 is moved into locking position under the pressure of its spring 254 to prevent relative movement of the carrier arms 214 and 216 and toe clamps 210 and 212 away from each other.

In accordance with one feature of the present invention, the toe clamps 210 and 212 are constructed and arranged to permit a ready removal of the toe clamps from the jack, and the substitution of others in order to permit a variation in the height of the clamps employed in accordance with the size of shoe to be placed in the jack, and to permit the substitution of one toe clamp for the other in accordance with whether a left or right shoe is being operated upon in the machine. It has been found desirable to determine with considerable accuracy the height of the clamps in accordance with the style and size of shoe, in order to insure a proper clamping engagement of the clamps with the lasted shoe upper, without at the same time causing interference with the shoe operating devices during the operation around the toe portion of the shoe. It has also been found that with the majority of lasts, the outside edge of the shoe sole adjacent the toe is located on the jack in a higher position than the inside sole edge, so that a somewhat longer toe grip member is necessary for adequately gripping the outside toe portion of the shoe. This condition is due to the fact that a majority of lasts have a certain amount of twist in them, so that when the heel portion of the shoe is placed in a vertical position on the heel post, the outside sole edge along the ball and toe portions of the shoe will occupy a relatively higher position on the jack than the inside sole edge. With the present construction, each of the toe clamps 210 and 212 is normally locked in position on the corresponding carrier arm by means of a locking device which may be readily actuated to permit the removal and substitution of one toe clamp for another. Referring specifically to Figs. 3, and 21 to 23, the top clamp 212 is held in position by means of a plunger 270 which is slidably mounted in a bore formed in the carrier arm 216, and also passes through a transverse groove formed in the cylindrical portion of the toe clamp 212. A compression spring 272 coiled about the plunger within an enlarged portion of the bore between the correspondingly enlarged head of the plunger and a shoulder in the bore, serves normally to maintain the plunger in the fully retracted locking position illustrated in Fig. 3. The movement of the plunger under the pressure of the spring 272 is limited by engagement of the enlarged head of a stop bolt 274 screw-threaded to the inner end of the plunger, with the surface metal adjacent the one end of the bore. There is also formed in the plunger a grooved portion 276 which is arranged when the plunger is pushed inwardly against the pressure of its spring 272 to move into a position registering with the groove in the cylindrical portion of the toe clamp 212, so that the toe clamp can be readily withdrawn from its socket. An identical locking device is provided for locking the toe clamp 210 in the corresponding socket formed in the carrier arm 214.

In accordance with certain features of the present invention, novel and improved mechanism is provided for manually tightening the jack after a shoe has been locked in position thereon, which operates first to move the toe clamps 210 and 212 tightly into clamping engagement with the toe portion of the lasted shoe upper, and thereafter operates to impart an additional movement to the locking ratchet 90 to tilt the heel support lever 28 and heel post 26, so that the toe portion of the shoe is forced tightly against the toe rest 24 to clamp the shoe securely in the jack. This mechanism comprises a manually operable clamp lever 280 which is mounted to turn on a pivot stud 282 on the jack frame 20, and is provided at its free end with a laterally extending handle 284. Connected to the clamping lever 280 is a link 286 which is secured at its upper end to an intermediate point on a cross lever 288 which operates, when moved downwardly by the actuation of the clamping lever 280, through mechanism connected to one end thereof to move the toe clamps 210 and 212 into clamping engagement with the shoe toe and through mechanism connected to the other end thereof to impart an additional movement to the locking ratchet 90 and associated parts to tighten the jack.

One end of the cross lever 288 is pivotally connected at 290 to a U-shaped lever 292 which is supported to turn on two studs 294 on the jack frame 20 and is connected through a link 296 to a horizontally extending arm of the bell-crank lever 234 for controlling the relative positions of the toe clamps 210 and 212.

The other end of the cross lever 288 is connected through a link 298 to the tail portion of a pawl 300 which is pivoted at 302 to a pawl lever 304 mounted to turn freely on the supporting shaft 88 for the ratchet 90. A tension spring 306 connected between an extension on the pawl lever 304 and a pin 308 on the jack frame 20 tends normally to maintain the lever 304 and pawl 300 in a fully raised or retracted position. A tension spring 310 secured at one end to the manual clamp lever 280 at the point of connection with the link 286 and at its other end to a pin 150 on the jack frame tends to swing the lever in a counterclockwise direction as shown in Fig. 1, to a normally retracted rest position.

The operation of the manually operable clamp lever 280 first to move the toe clamps 210 and 212 into clamping position and thereafter to impart an additional movement to the ratchet 90 to tighten the jack, may be described as follows:—

Assuming that a lasted shoe has been placed on the last pin 26 and the shoe then moved forward to engage the shoe toe with the toe rest 24 and feeler 60 so that the stopping and locking detents 70 and 92 are rendered operative to lock the shoe in the jack, the operator now moves the manual clamp lever 280 sharply upward in a clockwise direction as shown in Fig. 1, causing the link 286 and intermediate portion of the cross lever 288 connected thereto to be moved downwardly. Since a considerable resistance is provided to movement of the left hand end of the cross lever 288 and pawl mechanism above described by the spring 306, the cross lever 288 will turn about its pivotal connection with the link 298 to swing the U-shaped lever 292 downwardly, and acting through the link 296 and bell-crank 234 will move the toe clamps 210 and 212 into clamping engagement with the side toe portions of the shoe upper so that the shoe toe is firmly held in an adjusted position laterally of the jack. The locking block 250 which as above described is rendered operative by the release of the detent control lever 140 in locking the shoe on the jack, now acts to lock the cross arms 214 and 216 and toe clamps 210 and 212 carried thereon in clamping position.

The continued turning of the manual clamping lever 280 now causes the cross lever 288 to turn about its pivotal connection with the lever 292 as a fulcrum to move the pawl 300 and pawl lever 304 against the pressure of the spring 306 into engagement with the locking ratchet 90 so that an additional movement is imparted thereto to draw the locking rack 84 toward the toe portion of the jack. Since the arm 32 is held against further movement toward the toe support by the stop pawl 70 and intermediate connections including the stop rack 62, the effect is to further tilt the heel post 26 so that the toe portion of the shoe is brought into tight clamping engagement with the toe rest 24. The engagement of the locking detent 92 with the ratchet 90 operates to lock the jack in its tightened position. The manual clamping lever 280 is now permitted to return to its initial retracted position under the influence of its spring 310.

An additional tightening effect may be secured by the operator if so desired by again raising the manual clamping lever 280 which must operate as above described first to further tighten the clamping action of the toe clamps 210 and 212 and thereafter by advancing the locking ratchet 90 to force the shoe toe more tightly against the toe rest 24.

In order to open the jack and release the shoe, the jack herein disclosed is provided with a manually operable release lever 320 which as best shown in Figs. 2 and 5, comprises a plate extending transversely across the jack provided at each end thereof with broad surfaces to permit operation thereof by the operator from either side of the jack, and on its upper edge with two laterally extending ears 322 journalled to receive pivot studs 324 screw-threaded into the jack frame 20, so that the manual release lever 320 is permitted to swing freely on the pivot studs 324. There is also provided rigidly secured to the release lever 320, a curved arm 326 which is arranged to engage with a laterally extending portion of the extension 156 on the detent control lever 140. In order to open the jack and release the shoe, the operator has only to operate the release lever 320, thus causing the arm 326 to engage with and move the detent control lever 140 in a clockwise direction as shown in Figs. 2 and 7, thus causing the locking detent 92 to be tripped out of engagement with the locking ratchet 90, and simultaneously moving the toe clamp release lever 258 in a direction to release the toe clamp locking plate 250 as above described. The continued movement of the detent control lever to its fully retracted position in engagement with the latch 146 then causes the extension 156 to engage with and move the dog 74 in a counter-clockwise direction as shown in Fig. 2, so that a pressure is exerted on the stop detent 70 by the spring 80 to move the detent to open position. The releasing of the locking detent 92 and of the toe clamps 110 and 112 permits the heel supporting arm 32 to be moved away from the toe rest under the influence of its spring 36 and the heel supporting lever 28 and pin 26 to be tilted away from the toe rest under the influence of the spring 42 to permit the removal of the shoe from the heel pin and the placing of a new shoe on the jack by the operator with the least possible loss of time. The movement of the stopping ratchet 68 in a reverse direction as the stop rack 62 is moved away from the toe support with the opening of the jack, acts to release the stopping detent 70 which is then returned to its inoperative position under the influence of the spring 80.

The invention having been described, what is claimed is:—

1. A shoe supporting jack having, in combination, a jack frame, a toe rest on the jack frame, an arm pivoted on the frame to swing toward the toe rest to locate a shoe longitudinally on the jack, a heel support pivoted on the arm to tilt the shoe, spring means acting on the arm to move the arm away from the toe rest, a locking device mounted on said frame, and connections between said locking device and the heel support to lock said support against tilting movement and said arm against swinging movement respectively away from the toe rest to lock the shoe toe longitudinally and downwardly in engagement with the toe rest.

2. A shoe supporting jack having, in combination, a jack frame, a toe rest on the jack frame, an arm pivoted on the frame to swing toward the toe rest to locate a shoe longitudinally on the jack, a heel support pivoted on the arm to tilt the shoe, spring means acting on the arm to move the arm away from the toe rest, spring means acting on said heel support to tilt the shoe away from the toe rest, a locking device mounted on said frame, and connections between said locking device and the heel support to lock said support against tilting movement and said arm against swinging movement respectively away from the toe rest to lock the shoe toe longitudinally and downwardly in engagement with the toe rest.

3. A shoe supporting jack having, in combination, a jack frame, a toe rest on the jack frame, an arm pivoted on the frame to swing toward the toe rest to locate a shoe longitudinally on the jack, a lever pivotally mounted on the arm, a last pin carried by the lever, spring means acting to move the arm away from the toe rest, a locking device mounted on the frame, and connections between the locking device and the lever to lock the lever against tilting movement and said arm against swinging movement respectively away from the toe rest to lock the shoe toe longitudinally and downwardly in engagement with the toe rest.

4. A shoe supporting jack having, in combination, a jack frame, a toe rest on the jack frame, an arm pivoted on the frame to swing toward the toe rest to locate a shoe longitudinally on the jack, a lever pivotally mounted on the arm, a last pin carried by the lever, spring means acting to move the arm away from the toe rest, a locking device mounted on the frame, connections between the locking device and the lever to lock the lever against pivotal movement and said arm against swinging movement respectively away from the toe rest to lock the shoe toe longitudinally and downwardly in engagement with the toe rest, and means to actuate said locking device to permit the opening of the jack by said spring means.

5. A shoe supporting jack having, in combination, a heel support and toe rest relatively movable toward each other to locate a shoe longitudinally on the jack, spring means tending to maintain said parts in a relatively separated position, a locking device for locking the heel support and toe rest against movement from each other upon locating a shoe longitudinally in the jack, and manually operable means to actuate said locking device to permit the opening of the jack under the pressure of said spring.

6. A shoe supporting jack having, in combination, a heel support and toe rest relatively movable toward each other to locate a shoe longitudinally on the jack, spring means tending to maintain said parts in a relatively separated position, a locking device for locking the heel support and toe rest against movement from each other, a feeler member associated with the toe rest, and connections rendered operative by the engagement of the toe of the shoe with said feeler member to move the locking device into locking position.

7. A shoe supporting jack having, in combination, a heel support and toe rest relatively movable toward each other to locate a shoe longitudinally on the jack, spring means tending to maintain said parts in a relatively separated position, a locking device for locking the heel support and toe rest against movement from each other, a feeler member associated with the toe rest, connections rendered operative by the engagement of the toe of the shoe with said feeler member to engage said locking device, and manually operable means to actuate said lock to permit the opening of the jack under the pressure of said spring means.

8. A shoe supporting jack having, in combination, a jack frame, a toe rest on the jack frame, an arm pivoted on the frame to swing toward the toe rest to locate a shoe longitudinally on the jack, a heel support pivoted on the arm to tilt the shoe, spring means acting on the arm to move the arm away from the toe rest, a locking device mounted on said frame, connections between said locking device and the heel support to lock said support against tilting movement and said arm against swinging movement respectively away from the toe rest to lock the shoe toe longitudinally and downwardly in engagement with the toe rest, a feeler member associated with the toe rest, and connections actuated by the engagement of the feeler member with the toe of the shoe to move the locking device into locking position.

9. A shoe supporting jack having, in combination, a jack frame, a toe rest on the jack frame, an arm pivoted on the frame to swing toward the toe rest to locate a shoe longitudinally on the jack, a heel support pivoted on the arm to tilt the shoe, spring means acting on the arm to move the arm away from the toe rest, a locking device mounted on said frame, connections between said locking device and the heel support to lock said support against tilting movement and said arm against swinging movement respectively away from the toe rest to lock the shoe toe longitudinally and downwardly in engagement with the toe rest, a feeler member associated with the toe rest, connections actuated by the engagement of the feeler member with the toe of the shoe to render the locking device operative, and manually operable means for rendering said locking device inoperative to permit the opening of the jack under the pressure of said spring.

10. A shoe supporting jack having, in combination, a jack frame, a toe rest on the jack frame, an arm pivoted on the frame to swing toward and away from the toe rest, a heel support pivoted on the arm to tilt the shoe, a locking device comprising a locking member supported on the frame, and a movable member engaged thereby to prevent movement of the movable member in one direction, connections between the movable member and the heel support operative upon locating a shoe on the jack for locking the heel support against tilting movement and said arm against swinging movement respectively away from the toe rest to lock the shoe toe downwardly and longitudinally in engagement with the toe rest, and manually operable means for imparting an additional movement to said movable member to clamp the shoe firmly on the jack.

11. A shoe supporting jack having, in combination, a jack frame, a toe rest on the jack frame, an arm pivoted on the frame to swing toward and away from the toe rest, a heel support pivoted on the arm to tilt the shoe, a stop device to arrest the continued movement of the arm towards the toe rest upon the location of the shoe longitudinally on the jack, a locking device comprising a locking member supported on the frame, and a movable member engaged thereby upon locating a shoe on the jack to prevent movement of the movable member in one direction, connections between the movable member and the heel support for locking the heel support against tilting movement and said arm against swinging movement respectively away from the toe rest to lock the shoe downwardly and longitudinally in engagement with the toe rest, and manually operable means for thereafter imparting an additional movement to said movable member to clamp the shoe firmly on the jack.

12. A shoe supporting jack having, in combination, a jack frame, a toe rest on the jack frame, an arm pivoted on the frame to swing toward and away from the toe rest, a heel support pivoted on the arm to tilt the shoe, a stop device comprising a stop member mounted on the frame, and a cooperating member connected to the arm and arranged to be engaged by the stop member to arrest movement of the arm toward the toe rest, a locking device comprising a locking member mounted on the frame, a movable member engaged thereby to prevent movement of the movable member in one direction, connections between said movable member and heel support controlled by said locking member to lock the heel support against tilting movement and the arm against swinging movement respectively away from the toe rest to lock the shoe toe downwardly and longitudinally in engagement with the toe rest, a feeler member, connections rendered operative by the engagement of the shoe toe with said feeler member to engage each of said stopping and locking members, and manually operable means for thereafter moving the movable member with relation to the locking member to clamp the shoe on the jack.

13. A shoe supporting jack having, in combination, a jack frame, a toe rest on the jack frame, an arm pivoted on the frame to swing toward and away from the toe rest, a heel support pivoted on the arm to tilt the shoe, a locking device comprising a pawl and ratchet mechanism supported on the frame, connections between said ratchet and heel support controlled by the engagement of the pawl with the ratchet to lock said heel support against tilting movement and said arm against swinging movement respectively away from the toe rest to lock the shoe toe downwardly and longitudinally in engagement with the toe rest, and manually operable means for imparting an additional movement to the ratchet with relation to the pawl to clamp the shoe firmly on the jack.

14. A shoe supporting jack having, in combination, a jack frame, a toe rest on the jack frame, an arm pivoted on the frame to swing toward and away from the toe rest, a heel support pivoted on the arm to tilt the shoe, a stop device comprising a detent and ratchet mechanism supported on the frame, connections between said ratchet and arm controlled by the engagement of the detent with the ratchet to stop movement of the arm toward the toe rest, a locking device comprising a locking detent and ratchet mechanism supported on the frame, connections between said locking ratchet and heel support controlled by the engagement of the locking detent with said ratchet to lock the heel support against tilting movement and the arm against swinging movement respectively away from the toe rest to lock the shoe toe downwardly and longitudinally in engagement with the toe rest, means rendered operative upon the locating of the shoe longitudinally on the jack to move each of said detents into engagement with their respective ratchets, and manually operable means for thereafter moving said locking ratchet with relation to its detent to clamp the shoe on the jack.

15. A shoe supporting jack having, in combination, a jack frame, a toe rest on the jack frame, a heel supporting arm pivoted on the frame to swing toward the toe rest to locate a shoe longitudinally on the jack, a device for locking the arm from movement away from the toe rest comprising a ratchet, connections between the ratchet and the arm, a locking detent to engage the ratchet, a lever on which said detent is pivotally mounted, a trip member arranged for engagement with the detent to maintain the detent in operative position on said lever, means for disengaging said trip member from the detent, and means acting upon the release of the detent to move the heel supporting arm away from the toe rest.

16. A shoe supporting jack having, in combination, a jack frame, a toe rest on the jack frame, a heel supporting arm pivoted on the frame to swing toward the toe rest to locate a shoe longitudinally on the jack, spring means acting on the arm to move the arm away from the toe rest, a device for locking the arm from movement away from the toe rest comprising a ratchet, connections between the ratchet and the arm, a locking detent to engage the ratchet, a carrier lever on which said detent is pivotally mounted, a control lever movable independently of the detent carrying lever, acting in one position to hold the detent in operative position on its carrying lever, and in another position to release the detent, and means for moving the control lever with the detent carrying lever to bring the locking detent into engagement with the ratchet, and for moving the control lever independently of the detent carrying lever to release the detent.

17. A shoe supporting jack having, in combination, a jack frame, a toe rest on the jack frame, an arm pivoted on the frame to swing toward and away from the toe rest, a heel support pivoted on the arm to tilt the shoe, a locking device comprising a locking member supported on the frame and a movable member engaged thereby to prevent movement of the movable member in one direction, connections between the movable member and the heel support, operative upon locating a shoe on the jack to lock the heel support against tilting movement and said arm against swinging movement respectively away from the toe rest to lock the shoe toe downwardly and longitudinally in engagement with the toe rest, members for engaging opposite sides of the toe portion of the shoe to locate the toe portion of the shoe laterally on the jack, a jacking lever, and connections acting, when operated by the jacking lever, to move said toe locating members into engagement with the shoe and to impart an additional movement to the movable member of the locking device to clamp the shoe firmly on the jack.

18. A shoe supporting jack having, in combination, a jack frame, a toe rest on the jack frame, an arm pivoted on the frame to swing toward and away from the toe rest, a heel support pivoted on the arm to tilt the shoe, a locking device comprising a pawl and ratchet mechanism supported on the frame, connections between said ratchet and heel support controlled by the engagement of the pawl with the ratchet to lock said heel support against pivotal movement and said arm against swinging movement respectively away from the toe rest to lock the shoe toe downwardly and longitudinally in engagement with the toe rest, members for engaging opposite sides of the toe portion of the shoe to locate the toe portion of the shoe laterally on the jack, a jacking lever, and connections acting, when operated by the jacking lever, to move said members into engagement with the shoe and to impart a movement to the ratchet with relation to the pawl to clamp the shoe firmly on the jack.

19. A shoe supporting jack having, in combination, a heel support and toe rest relatively movable toward and from each other, said members being arranged for relative movement toward each other to locate a shoe on the jack, a feeler arranged to be engaged by the toe of the shoe, means controlled by the feeler for stopping the relative movement of the heel support and toe rest, a cam, connections actuated by the cam for adjusting the height of the feeler above the toe rest for operation with shoes of different sizes, and means conveniently accessible to the operator for manually operating the cam.

20. A shoe supporting jack having, in combination, a heel support and a toe rest relatively movable toward each other to locate a shoe longitudinally on the jack, toe centering members arranged to engage opposite sides of the toe portion of a shoe to locate the toe portion of the shoe laterally on the jack, movable supporting members for said toe centering members, said supporting members being provided with sockets in which cylindrical portions of the toe centering members are fitted, and a retaining plunger mounted in each supporting member arranged to engage the cylindrical portion of a toe centering member and removably secure the toe centering member to the supporting member.

GARRETT P. S. CROSS.